Figure 1:
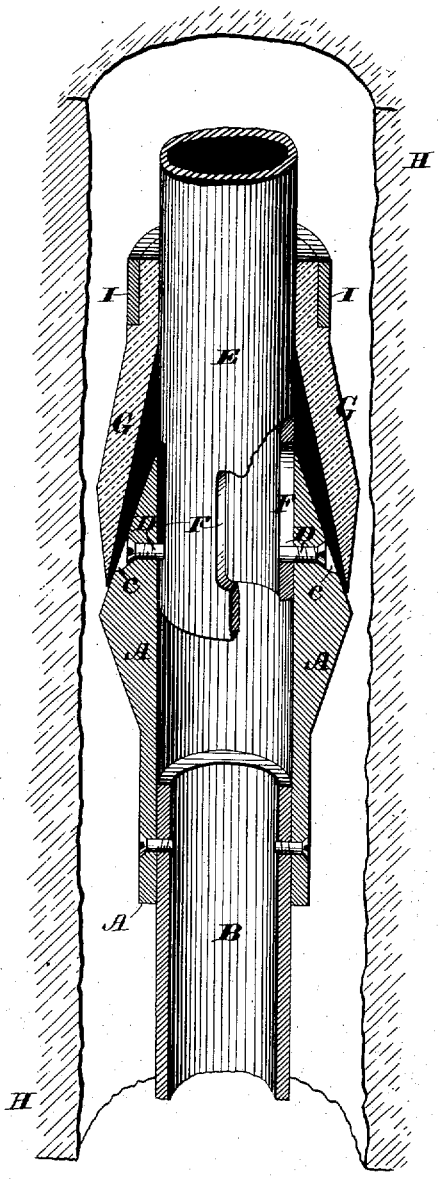

J. K. ROBINSON & D. A. STRONG.

Packing for Deep Wells.

No. 8,786. Reissued July 1, 1879.

WITNESSES:

Jas. E. Hutchinson

Henry C. Hazard.

INVENTORS.

John K. Robinson and David A. Strong

Per. Jno K Hallock

Atty.

UNITED STATES PATENT OFFICE.

JOHN K. ROBINSON, OF WASHINGTON, DISTRICT OF COLUMBIA, AND DAVID A. STRONG, OF CHICAGO, ILLINOIS.

IMPROVEMENT IN PACKINGS FOR DEEP WELLS.

Specification forming part of Letters Patent No. 52,448, dated February 6, 1866; Reissue No. 8,786, dated July 1, 1879; application filed October 17, 1878.

*To all whom it may concern:*

Be it known that we, JOHN K. ROBINSON, of Washington, District of Columbia, and DAVID A. STRONG, of Chicago, Illinois, (late of Washington, District of Columbia,) did invent certain new and useful Improvements on Devices for Packing the Discharging-Tubes of Oil or other Deep-Bored Wells; and we do hereby declare the following to be a full, clear, and exact description thereof, reference being had to the accompanying drawings and the letters of reference marked thereon, which form a part of this specification.

In oil or other deep wells it is necessary, in order to obtain the desirable products unmingled with the undesirable products, to pack the eduction-tube so as to shut off the undesirable products and allow only the desirable products to pass up through the tube. Our invention relates to the construction of this packing device.

Various devices have been used for this purpose, such as a seed-bag—that is, a bag attached to the tubing at the desired point and filled with flaxseed, which, when soaked by the fluids of the well, swells and expands the bag so as to stuff or pack the well. Another device for this purpose is a bag attached to the tube and provided with devices whereby it can be inflated or collapsed, as desired, as in the patent to H. W. Spooner, dated February 26, 1861. Another device was an annular bag, which surrounded the tube and could be raised and lowered on the tube, and when at the point desired it could be inflated. This is shown in the patent to S. L. Fox, patented January 10, 1865. Another device consists of two disks or flanges, with a packing material consisting of cotton-waste saturated with beeswax interposed between them, and devices for raising and lowering the same on the tubing, and when in proper position the flanges are made to approach each other by means of screws, and thus press the packing against the wall of the well and the tube. This is shown in patent to J. R. Cross of February 7, 1865. Cross also describes a tube made with a slide-joint between the flanges, (which he uses to compress his packing,) so that when the lower end of the lower part of the tube touches the bottom of the well the weight of the upper portion will cause the joint to slide together, and thus compress the packing. In the patent to Redmond, reissued February 6, 1877, is shown still another device, which, like the devices of Fox and Cross, is loose upon the tubing and is raised and lowered by ropes or chains. The packing in this case is effected by forcing an annular wedge into a cup-shaped packing by means of a screw operated by a windlass and beveled pinions and chains running to the top of the well. Still another device is that shown in patent to J. Moulton of March 14, 1865, which is an elastic cup, intended to be expanded by the weight of the column of water resting upon it.

Our invention is in no way like the devices above named. Cross states in his patent that when using the slide-joint between the flanges it would be necessary to use rods or bolts to support the lower part of the tube in drawing it out of the well, whereas in our construction we propose to employ a metal cylinder surrounding one section of the tube in such manner as to permit a vertical movement of the upper tube-section, and to connect the outer cylinder with the tube-section which slides within it in such a manner that when the upper tube-section is withdrawn from the well it shall take with it the outer cylinder and the flexible or yielding packing material.

It is obvious that these details may be carried out by various modified devices, as, for example, a double-ended globe-like elastic device may be made fast to the tube-sections, and it would be compressed against the walls of the well. Upper tube-section continues to move downward after the lower section ceases to descend, and the lower section could thus be lowered into and withdrawn from the well. Another form, and the one we herewith use to illustrate our invention, and which we believe to be preferable, is to connect the two sections of tube together, so that the upper section can move vertically relative to the lower section, and on one of the sections place a ring or band of elastic material and on the other section place an enlargement or unyielding band or ring, and as the upper section can move downward relative to the lower section the elastic ring or band will be compressed or expanded, and thus pack the well.

The construction of the joint or coupling may be varied without departing from the spirit of our invention in that particular, which is, as has been stated, to permit the upper section to move vertically relative to the lower section, so as to compress the packing and still be so joined that the lower section will be raised and lowered by remaining connected with the upper section. The accompanying drawings sufficiently illustrate this point, as well as others, and with the specification will enable persons skilled in the arts to construct and apply our invention.

Figure 2:
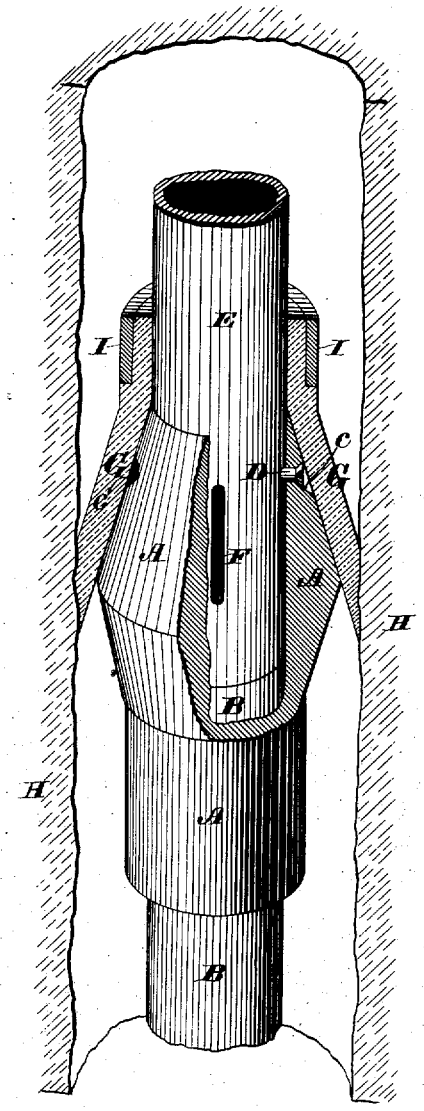

In the drawings, Figure 1 is a vertical longitudinal section of the attachments to the tubing, and the tubing itself is left in elevation perspective, with parts broken out to show construction. Fig. 2 is a very similar view, only the tube-sections are shown approached together and the well packed, while in Fig. 1 the parts are shown as if entering the well.

In these illustrations the flexible packing G is shown as a ring or band clamped to the upper section, E, and the unyielding band or enlargement is shown as a cone or annular wedge, which, as the upper section moves downward relative to the lower section, slips under the band G and extends or expands it against the wall of the well, as shown in Fig. 2.

In the device shown in Figs. 1 and 2 the coupling is a telescopic or slip joint, made by the use of a short piece of pipe of greater caliber than the tubing. In this instance the larger pipe is formed by the unyielding band or enlargement A.

To prevent the movable piece of tubing, which in this case is the upper one, E, from slipping out of the larger section, A, and yet allow it to slip up and down relative to the other section, B, it is provided with slots F, and stop pins or screws D pass through the pipe A and enter these slots. When thus coupled the upper section can move vertically relative to the lower section, and still the upper one will lift the lower one out of the well.

By using a slip-joint or telescopic joint we are enabled to utilize the weight of superincumbent tubing as the power necessary to compress and expand the packing.

As these wells are often very deep, and the packer is placed near the bottom, the weight of superincumbent tubing is very great and amply sufficient to compress the packing without the use of screws or other mechanical appliances.

It will be observed, as stated above, that with our device the packing of the well is effected by the action of the tubing itself upon the packing device, and that all devices to be used inside or outside the tubing for operating the packing device are not necessary.

As the upper section is raised the packing is loosened, and when it is lowered the packing is compressed and expanded, which movements are effected from above, at the mouth of the well.

By an examination of the drawings it will be seen that the upper portion of the part A not only serves as a wedge and a support against which the rubber annulus is thrust by the weight of the upper section of tubing, but it also forms a tubular connection or sleeve surrounding the lower end of the upper tube-section, within which said upper tube-section can slide vertically relative to the lower tube-section.

What we claim as our invention is—

1. In combination with the eduction-tube of an oil or other deep well, an outer tubular connection attached to the tubing in such manner that the upper section can move vertically, and a rubber annulus supported against downward thrust by the outer tubular connection and pressed against the wall of the well by the weight of the vertically-moving eduction-tube, substantially as set forth.

2. An eduction-tube of an oil or other deep well, made in two sections connected with each other by means of an outer tubular connection in such manner that the upper section can slide vertically, and the rubber annulus surrounding the tube supported against downward thrust by the lower tube-section and pressed against the wall of the well by the upper tube-section, substantially as set forth.

3. In combination with the eduction-tube of an oil or other deep well, which is composed of two sections, an elastic or flexible packing and a telescopic coupling which is provided with means, substantially as described, whereby, when the upper section is removed from the well, the lower section will be carried up with it.

4. An eduction-tube of an oil-well or other deep well, composed of two sections coupled together in such manner that the upper section can slide vertically relative to the lower section, in combination with a flexible ring or band supported upon one of the tube-sections, and an unyielding wedge-shaped enlargement which presses the packing against the wall of the well when the upper section of the tubing moves downward relative to the lower section, substantially as set forth.

In testimony that we claim the foregoing as our invention we, the said JOHN K. ROBINSON and DAVID A. STRONG, have hereunto set our hands this 12th day of October, 1878, at Chicago, Illinois.

JOHN K. ROBINSON.
DAVID A. STRONG.

Witnesses:
JNO. K. HALLOCK,
JULIUS ROSENTHAL.